US005493763A

United States Patent [19]
Yamanaka et al.

[11] Patent Number: 5,493,763
[45] Date of Patent: Feb. 27, 1996

[54] NUMERICALLY CONTROLLED LATHE WITH BALANCE CORRECTOR

[75] Inventors: Hideharu Yamanaka; Tomoki Shinozaki, both of Aichi, Japan

[73] Assignee: Okuma Corporation, Japan

[21] Appl. No.: 248,190

[22] Filed: May 24, 1994

[30] Foreign Application Priority Data

May 24, 1993 [JP] Japan ..................... 5-145651

[51] Int. Cl.$^6$ .............................. B23P 23/02; G01M 1/04
[52] U.S. Cl. ............... 29/27 C; 73/468; 82/903; 408/2; 409/133
[58] Field of Search .................... 29/27 R, 27 C, 29/901, 27 A; 73/458, 468, 460, 461; 82/903; 408/2; 409/132, 133, 131

[56] References Cited

U.S. PATENT DOCUMENTS

| | | | |
|---|---|---|---|
| 2,492,092 | 12/1949 | Bulliet | 408/2 |
| 2,731,887 | 1/1956 | Sjöstrand | 409/133 |
| 2,909,948 | 10/1959 | Gruber | 408/2 |
| 3,805,624 | 4/1974 | Martin | 73/462 |
| 4,545,021 | 10/1985 | Suzuki et al. | 73/460 X |
| 4,852,405 | 8/1989 | Schonfeld | 73/461 |
| 4,986,149 | 1/1991 | Carmel | 82/903 |

FOREIGN PATENT DOCUMENTS

| | | | |
|---|---|---|---|
| 139894 | 4/1965 | France | 73/468 |
| 54482 | 5/1977 | Japan | 73/468 |
| 114735 | 6/1985 | Japan | 73/460 |
| 897064 | 5/1962 | United Kingdom | 73/460 |

OTHER PUBLICATIONS

"Automatic Mass Centering and Dynamic Balancing" pp. 283–288 *The Machinist* Feb. 18, 1955.

*Primary Examiner*—William Briggs
*Attorney, Agent, or Firm*—Dickstein, Shapiro & Morin

[57] ABSTRACT

A lathe capable of performing both usual machining and balance correction machining of a workpiece. In a combined machining lathe having a drilling and/or milling machine, vibration sensor(s) are attached to a headstock and/or a tailstock and a sensor for detecting a rotation angle of a main spindle is provided. After the usual machining, the workpiece is rotated at a predetermined rotating speed on the same lathe and an amount of imbalance and phase are calculated by a imbalance arithmetic unit. An NC machining program for balancing the workpiece is automatically produced by a balance correction machining program producer within a numerical controller and balance correction machining of the workpiece is carried out using a rotary tool such as a drill or the like.

4 Claims, 12 Drawing Sheets

NUMERICALLY CONTROLLED LATHE WITH BALANCE CORRECTOR

BACKGROUND OF THE INVENTION i) Field of the Invention

The present invention relates to a numerically controlled lathe capable of successively carrying out usual machining and balance correction machining.

ii) Description of the Related Arts

Figure 16:
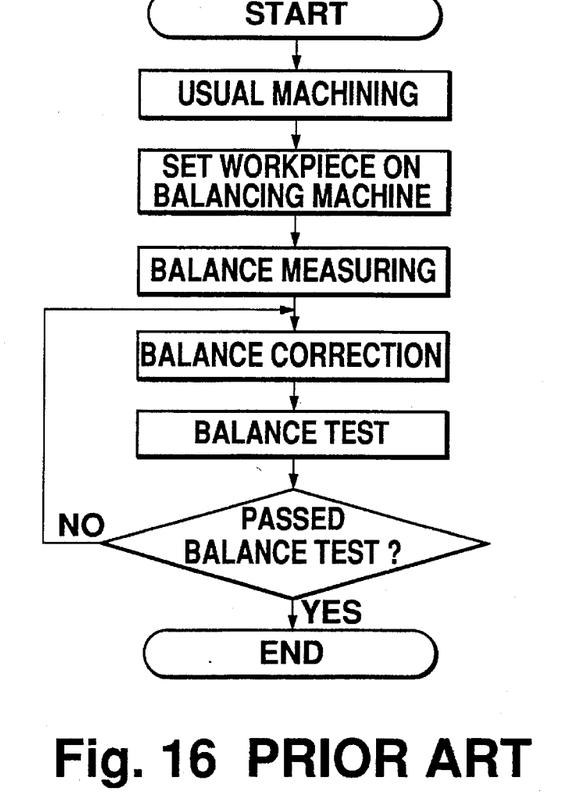
FIG. 16 is a flowchart of an operation of conventional machining of a workpiece including balance correction thereof.
Figure 17:
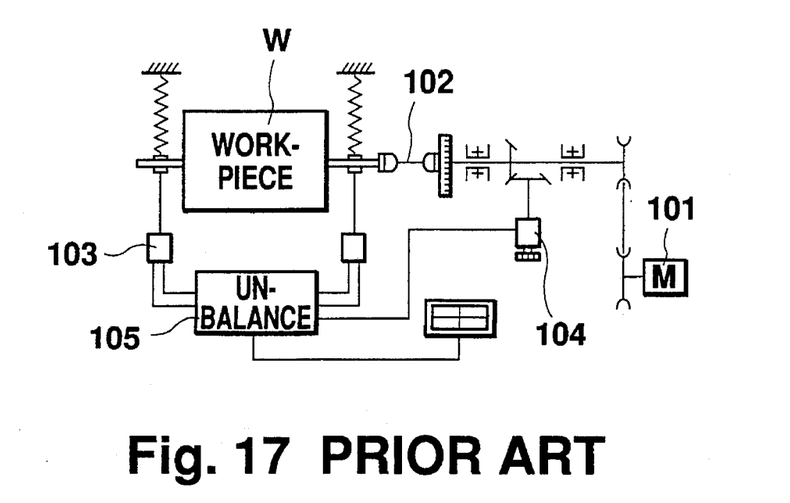
FIG. 17 is a schematic view of a conventional balancing machine.

Conventionally, in order to take a dynamic balance of a workpiece, as shown by a flow chart in FIG. 16, at a final step after finishing the usual machining of a workpiece using a lathe or the like, balance correction machining of the workpiece is carried out. FIG. 17 schematically shows balance correction machining of a workpiece W. First, a workpiece W is mounted on a balancing machine and is rotated at a predetermined rotation speed by a drive motor 101 via a universal coupling 102, and an amount of imbalance and phase of the workpiece W is measured using signals output from a vibration sensor 103 and a rotation angle detector 104 in an imbalance measuring circuit 105, and a biased weight part of the workpiece W is cut off by a drilling machine or the like attached to or separated from the balancing machine so as to carry out balance correction machining. Further, the balance test (balance measuring) of the workpiece W is performed again and, when the workpiece W has not pass the balance test yet, the balance correction machining is executed again.

In the conventional balance correction method, as described above, the workpiece W is removed from the machining apparatus and is then mounted to the balancing machine for carrying out the balance correction. Hence, it is a waste of labor and time and deleats the object of automation.

SUMMARY OF THE INVENTION

It is therefore an object of the present invention to provide a numerically controlled lathe in view of the above-described problems of the prior art, which is capable of continuously carrying out balance correction of a workpiece on the same lathe by numerically controlled machining after usual machining of the workpiece without changing the mounting of the same.

Further, a numerically controlled lathe with a balance corrector according to the present invention in a combined machining lathe having a drilling and/or milling machine, a numerically controlled lathe with a balance corrector, comprises a sensor for detecting a rotation angle of a main spindle; a vibration sensor mounted on a headstock; means for calculating an of amount imbalance and phase of a workpiece from signals output from the sensor and the vibration sensor; and means for producing a program for carrying out balance correction machining using the drilling and milling machine from the obtained unbalance amount and phase.

In order to achieve the object, a numerically controlled lathe with a balance corrector according to the present invention in a combined machining lathe having a drilling and/or milling machine, a numerically controlled lathe with a balance corrector, comprises a sensor for detecting a rotation angle of a main spindle; a pair of vibration sensors mounted on a headstock and a tailstock; means for calculating an amount of imbalance and phase of a workpiece from signals output from the sensor and the vibration sensors; and means for producing a program for carrying out balance correction machining using the drilling and milling machine from the obtained amount of imbalance amount and phase.

Still further, a numerically controlled lathe with a balance corrector according to the present invention in a numerically controlled lathe having a non-round machining unit for carrying out a non-round machining by a synchronous X-axis feeding of a tool post with a rotation of a main spindle, a numerically controlled lathe with a balance corrector, comprises a sensor for detecting a rotation angle of the main spindle; a vibration sensor mounted on a headstock; means for calculating an eccentric amount at a balance correction from an amount of imbalance amount and phase of a workpiece, which are calculated from signals output from the sensor and the vibration sensor; and means for producing a program for carrying out a balance correction eccentric machining using the non-round machining unit from the obtained eccentric amount.

According to the present invention, after usual machining of a workpiece is finished by the combined machining lathe, successively, a balance of the workpiece is measured on the same lathe and, when the amount of imbalance is at least an allowance, an NC program for the balance correction machining is automatically produced. Drilling machining of the workpiece is carried out by a rotary tool such as a drill or the like to correct the balance of the workpiece.

Further, according to the present invention, by the lathe having the non-round machining unit, after a lathe turning of the workpiece, the balance of the workpiece is measured on the same lathe and the amount of imbalance amount and phase are calculated to obtain the eccentric amount at the balance correction. Then the balance correction machining program is automatically produced and the balance correction machining is carried out by the non-round machining unit.

Hence, according to the present invention, the balance correction can be performed without moving the workpiece and the machining of the whole workpiece can be readily carried out. Further, the balance correction can be carried out with high accuracy by the NC machining of the lathe.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

The present invention will now be described in connection with its preferred embodiments with reference to the accompanying drawings, wherein like reference characters designate like or corresponding parts throughout the views and thus the repeated description thereof can be omitted for brevity.

First, the first embodiment of a numerically controlled lathe with a balance corrector according to the present invention will now be described.

Figure 1:
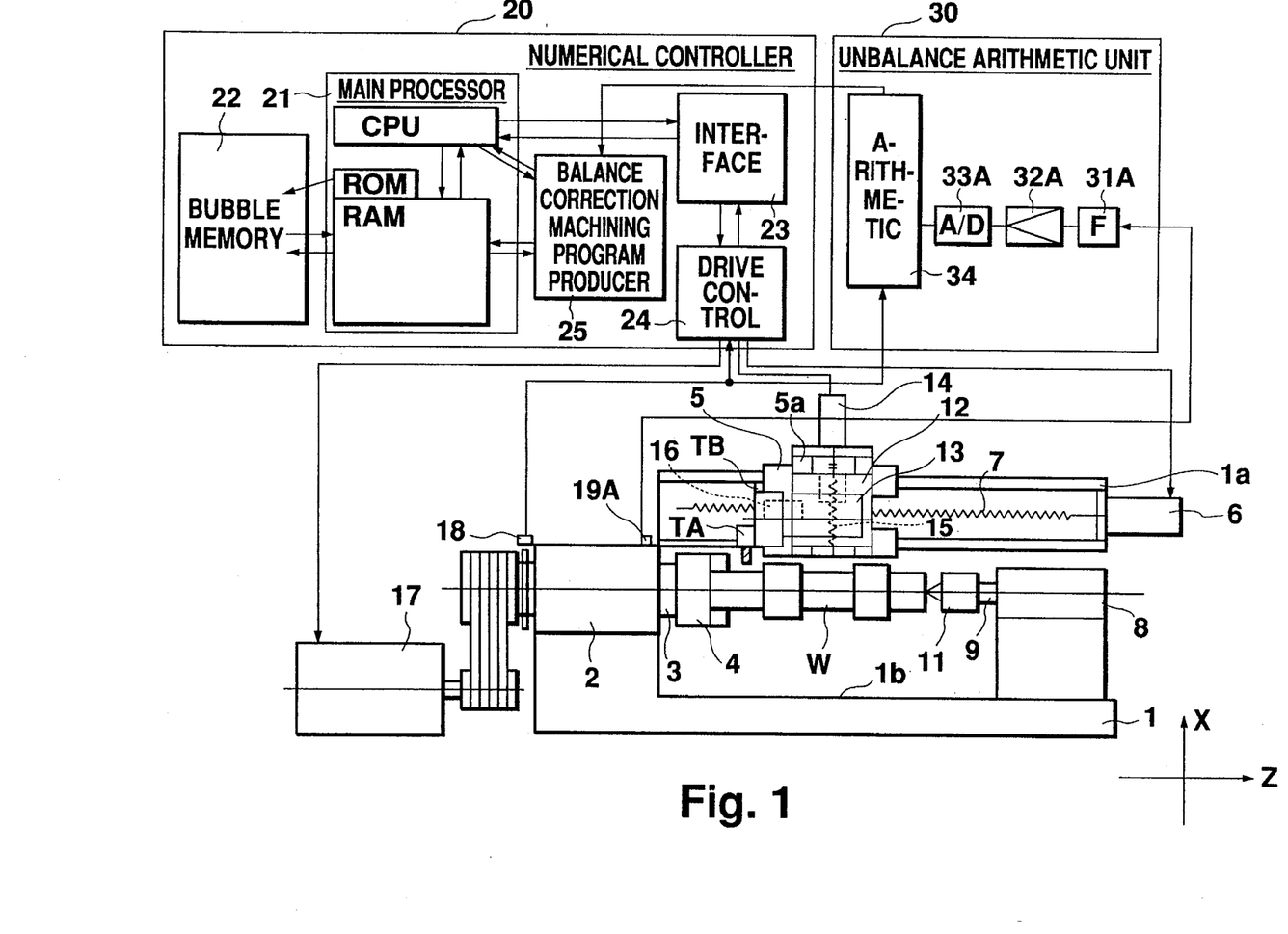
FIG. 1 is a schematic view of one embodiment of a numerically controlled lathe with a balance corrector according to the present invention.

In FIG. 1, there is shown a numerically controlled lathe with a balance corrector for carrying out combined machining. In this case, on the upper left hand side of a bed 1 installed on a floor, a headstock 2 is placed and a main spindle 3 is rotatably mounted on the headstock 2 using a plurality of bearings (not shown). A chuck 4 is concentrically engaged to the front end of the main spindle 3. Two pairs of Z-axis guides 1a and 1b are secured onto the bed 1. A saddle 5 is movably mounted on one pair of Z-axis guides 1a and is movably positioned by a Z-axis motor 6 via a ball screw 7. A tailstock 8 is movably mounted on the other pair of Z-axis guides 1b. A tailstock spindle 9 is movably supported by the tailstock 8 so as to be concentric with the main spindle 3 and to be movable in the Z-axis direction and a center 11 is attached on the front end of the tailstock spindle 9.

The saddle 5 is provided with an X-axis guide 5a extending in the X-axis direction on its top surface and a tool post 13 is movably placed on the X-axis guide 5a via a middle mount 12 and is movably positioned by an X-axis motor 14 via a ball screw 15. On the tool post 13, a turret 16 rotatably mounted so as to rotate and to index around a rotation axis in the Z-axis direction and includes a plurality of tool hold stations in which a rotary tool TA and a fixed tool TB are detachably held.

The main spindle 3 is driven by a C-axis motor 17 which is numerically controlled. A sensor 18 for detecting the rotation angle of the main spindle 3 is mounted on the headstock 2 and a vibration sensor 19A and is attached on the rear surface of the headstock 2. In this embodiment, a Vibroport 30 (Trade Name, made by Schenck Inc. in Germany) can be used for the vibration sensor 19A. On the floor, a numerical controller 20 and an imbalance arithmetic unit 30 are arranged behind the bed 1. The numerical controller 20 includes usual functional members such as a main processor 21 composed of a CPU, a ROM and a RAM, a bubble memory 22, an interface 23, a drive controller 24 and the like, and further a balance correction machining program producer 25. The imbalance arithmetic unit 30 includes a noise filter (F) 31A for removing noise from the signal output from the vibration sensor 19A, a signal amplifier 32A for amplifying the signal output from the noise filter (F) 31A, an A/D (analog-digital) converter 33A for converting the analog signal sent from the signal amplifier 32A into a digital signal, and an arithmetic processor 34 for calculating an amount of imnbalance and phase of a workpiece W from the digital vibration signal output from the A/D converters 33A and a main spindle rotation angle signal sent from the sensor 18.

Figure 2:
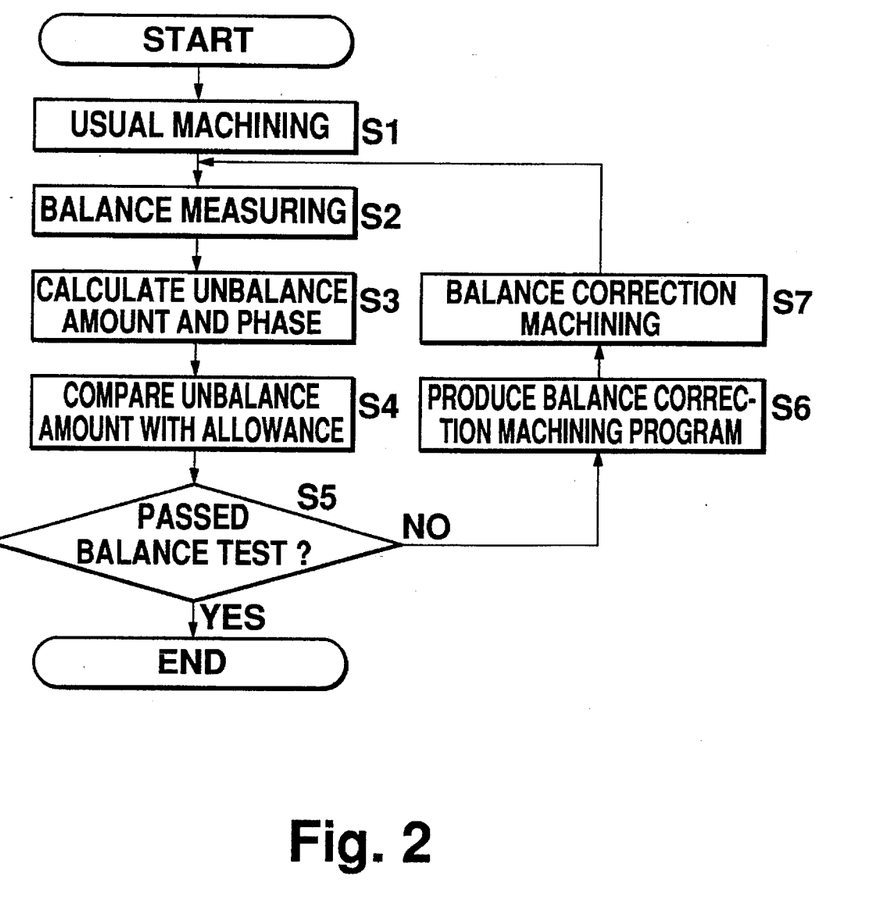
FIG. 2 is a flowchart of an operation of the numerically controlled lathe shown in FIG. 1.
Figure 4:
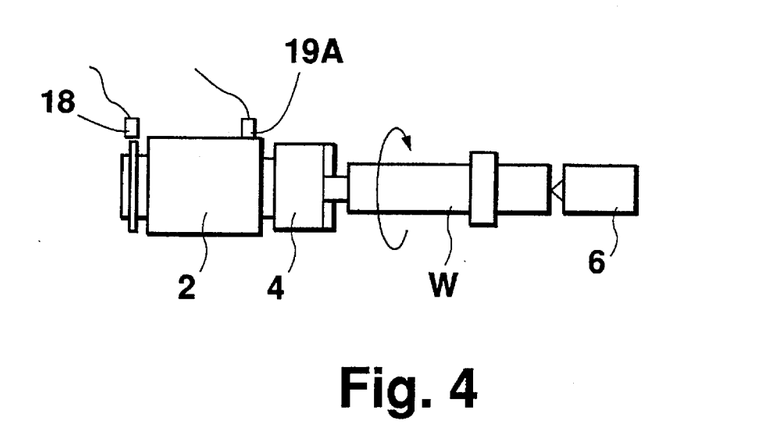
Figure 5:
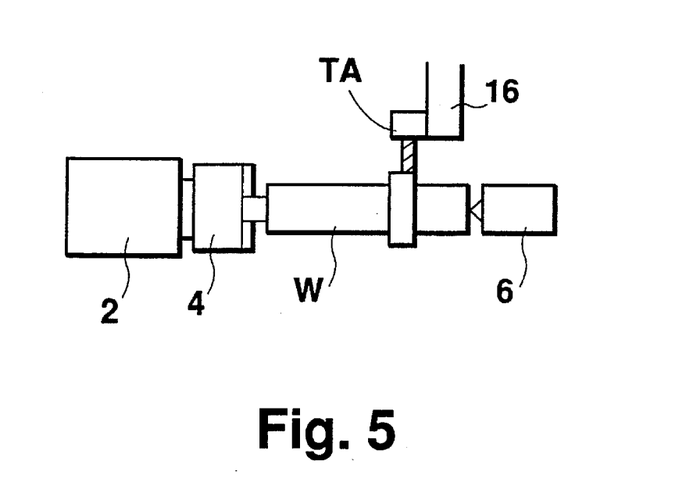

Next, the operation of the numerically controlled combined machining lathe with a balance corrector described above will now be described in the order of the steps of a flowchart shown in FIG. 2 with reference to operational explanatory views FIG. 3 to FIG. 5.

Figure 3:
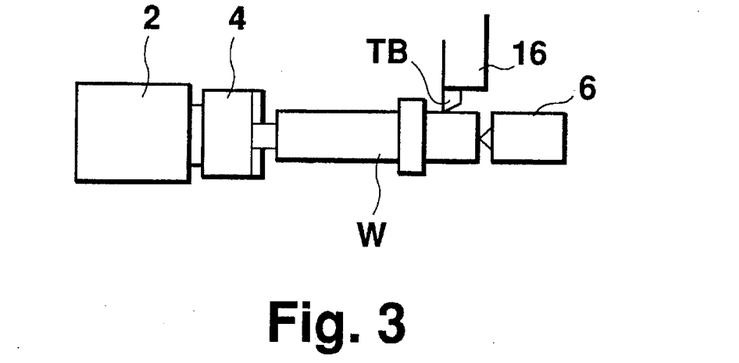
FIGS. 3, 4 and 5 are elevation views of an essential part of the numerically controlled lathe shown in FIG. 1 for explaining an operation thereof.

First, in step S1, as shown in FIG. 3, predetermined usual machining such as lathe turning, milling or the like of a workpiece W mounted on the combined machining lathe is carried out. Next, in step S2, while the workpiece W is still-held on the lathe, as shown in FIG. 4, the workpiece W is rotated at a predetermined rotating speed and its balance is measured using the vibration sensor 19A and the rotation angle sensor 18. In step S3, the imbalance arithmetic unit 30 calculates an amount of imbalance and phase of the workpiece W from the output signal of the vibration sensor 19A and the main spindle rotation angle signal of the sensor 18.

Figure 6:
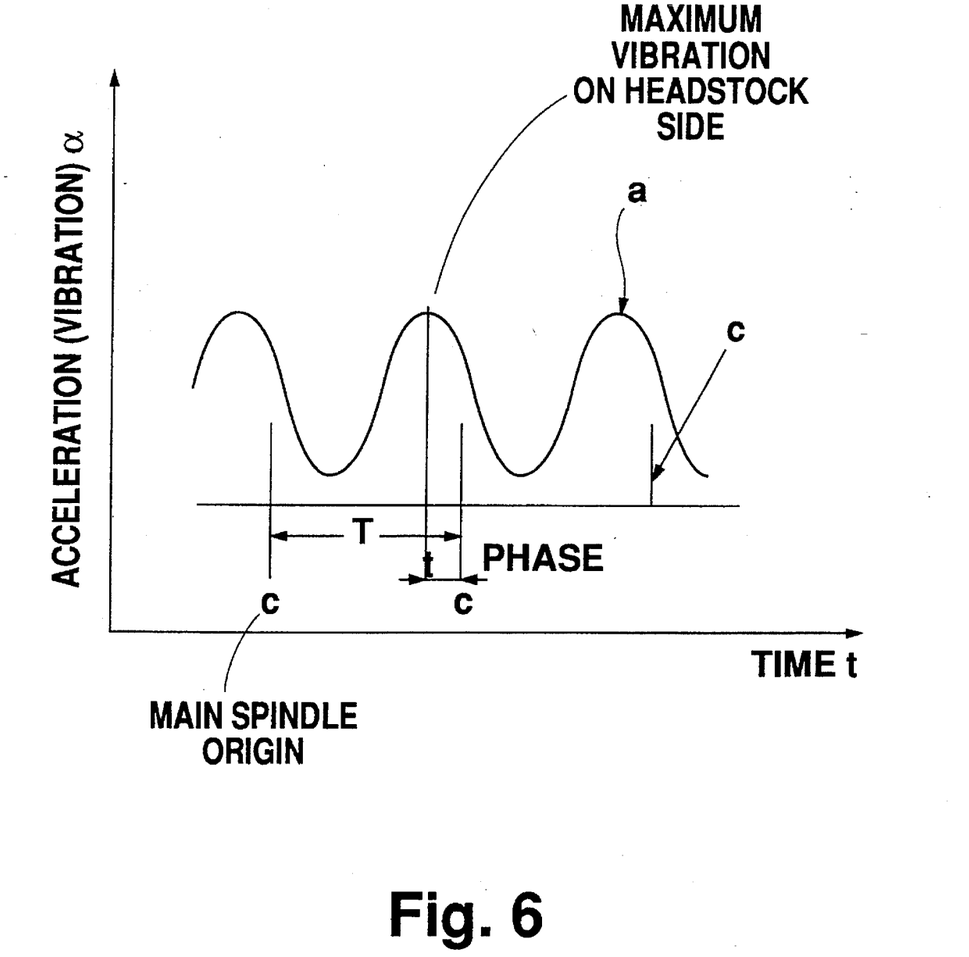
FIG. 6 is a graphical representation showing a relationship between signals from a vibration sensor and a rotation sensor of a main spindle and an imbalance amount and phase according to the first embodiment of the present invention.

FIG. 6 shows the relationship between the signals of the vibration sensor 19A and the sensor 18 and the amount of imbalance and phase of the workpiece W in one measuring example. In FIG. 6, a indicates an acceleration (vibration) signal detected by the vibration sensor 19A on the headstock side, and c a spindle index signal output per one rotation of the main spindle 3.

The angle of the phase t' showing the direction of the imbalance from the main spindle index point C is calculated according to an equation $\theta = (t/T) \times 360°$. The above calculation of the amount of imbalance and phase is performed in the same manner as a conventional method.

Then in step S4, the obtained imbalance amount is compared with an allowance previously stored and in step S5, it is confirmed whether the balance test is passed or not. In the case of NO answer, in step S6, a depth of a balancing hole is calculated from the imbalance amount and phase obtained in the balance correction machining program producer 25 and an NC program for a balance correction machining is produced. In step S7, as shown in FIG. 5, a balance correction is machined in a flange portion of the workpiece W using the rotary tool TA such as a drill or the like. The operation is returned to step S2 and the imbalance measuring of the workpiece W that has just undergone the correction machining is carried out again in the same manner as described above. In step S5, when the answer is YES, the operation is finished.

Hence, as described above, according to the present invention, the balance correction can also be carried out with high accuracy by the NC machining of the lathe.

The second embodiment of a numerically controlled lathe with a balance corrector according to the invention will now be described.

Figure 7:
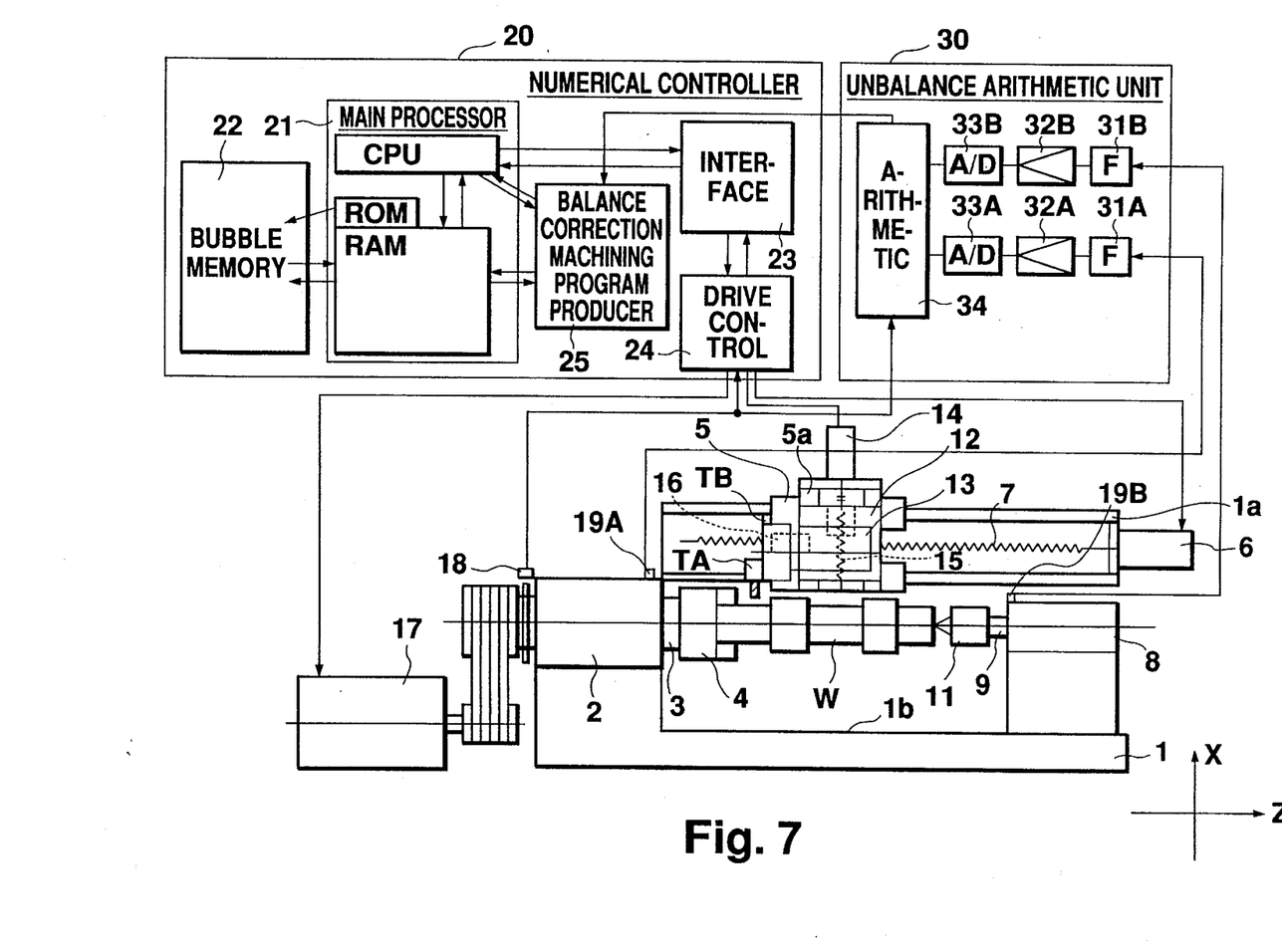
FIG. 7 is a schematic view of the second embodiment of a numerically controlled lathe with a balance corrector according to the present invention.
Figure 8:
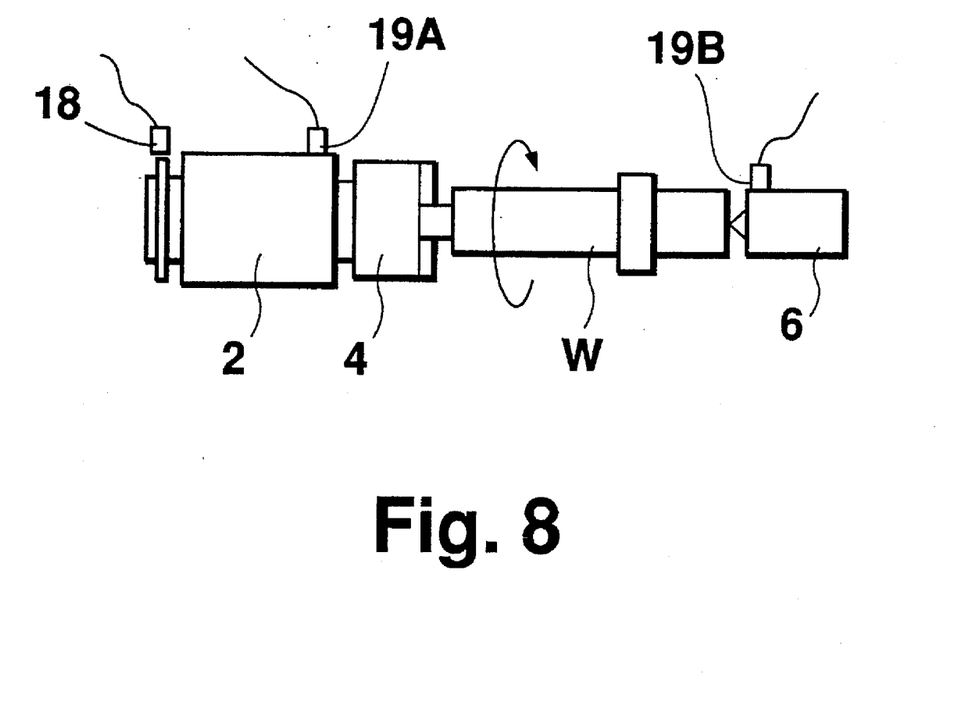
FIGS. 8 is an elevational view of an essential part of the numerically controlled lathe shown in FIG. 7 for explaining the operation thereof.

As can be seen in FIG. C, the second embodiment is constructed similarly to the first embodiment, except that a second vibration sensor 19B is attached on the rear surface of the tailstock 8, and that the imbalance arithmetic unit further comprises a noise filter (F) 31b for removing noise from the signal output from the vibration sensor 19B,, a signal amplifier 32B for amplifying the output from the noise filter (F), and an A/D converter 33B for conberting the analog signal sent from the signal amplifier 32b into a digital signal.

The operation of the numerically controlled lathe of the second embodiment is similar to that of the first embodiment, except that the imbalance arithmetic unit 30 also uses the output from the vibration sensor 19B to calculate an amount of imbalance and phase of the workpiece, as can be seen from FIG. A.

Figure 9:
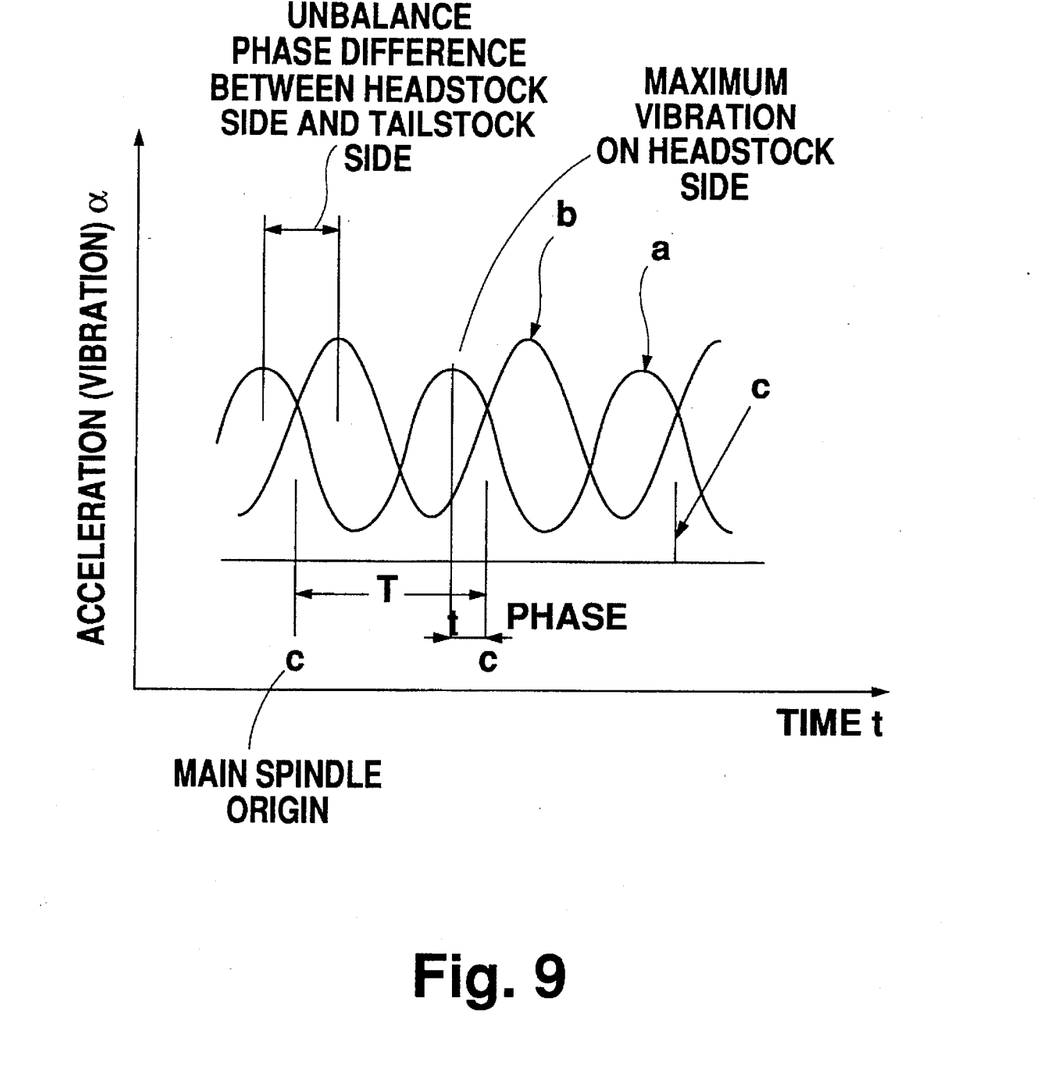
FIG. 9 is a graphical representation showing a relationship between signals from vibration sensors and a rotation sensor of a main spindle and an imbalance amount and phase according to the second embodiment of the present invention.

By referring again to FIG. 11, the relationship between the signals of the vibration sensors 19A and 19B and the sensor 18 and the imbalance amount and phase of the workpiece W in another measuring example can be seen. b indicates an acceleration (vibration) signal detected by the vibration sensor 19B on the tailstock side.

Next, the third embodiment of a numerically controlled lathe with a balance corrector according to the present invention will be described.

Figure 10:
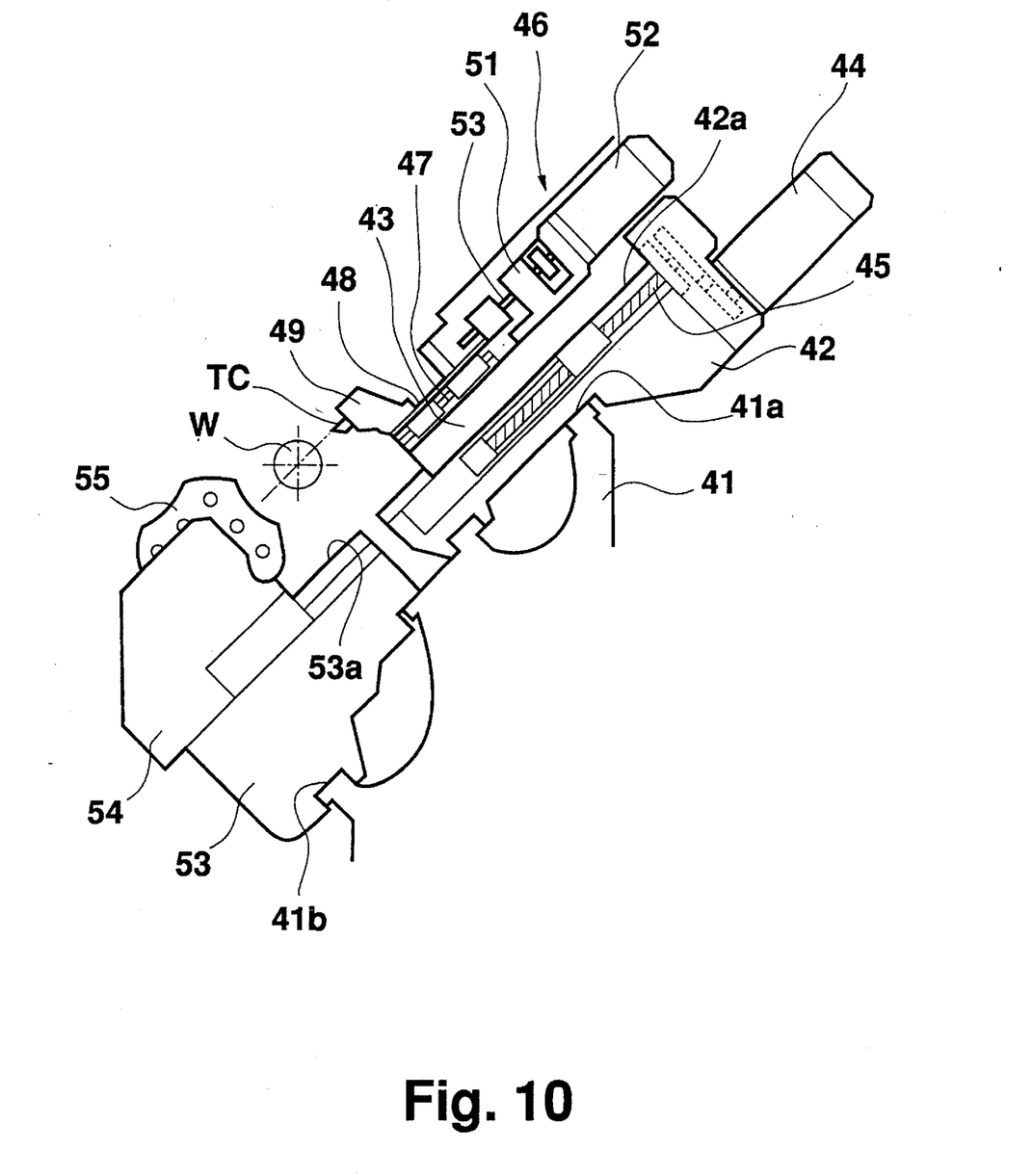
FIG. 10 is a side view of the third and fourth embodiments of a numerically controlled lathe having a non-round machining function according to the present invention.

In a lathe having a non-round machining unit, as shown In FIG. 10, on one Z-axis guide 41a placed on a bed 41, an upper saddle 42 is movably mounted so as to be movably positioned. On an $X_A$-axis guide 42a secured on the upper surface of the upper saddle 42, a middle mount 43 is movably mounted and is movably positioned by an $X_A$-axis motor 44 via a ball screw 45. A non-round machining unit 46 is supported by the middle mount 43. In the non-round machining unit 46, a guide plate 47 having an $X_S$-axis guide 47a is secured on the front side of the middle mount 43 and on this $X_S$-axis guide 47a, an upper mount 48 is movably mounted. On the upper mount 48, a fixed tool holder 49 is secured and a fixed tool TC is detachably held by the fixed tool holder 49. The upper mount 48 is movably positioned on the rear side of the middle mount 43 through a bracket 51 by an $X_S$-axis motor 52 via a ball screw 53.

A movable body including the upper mount 48, the fixed tool holder 49 and the like is fabricated to be light-weight and since an inertial force at a reciprocating motion of the non-round machining by a synchronous control of the $X_S$-axis motor 52 with the C-axis is small, the high speed machining can be carried out.

Moreover, on the other Z-axis guide 41b of the bed 41, a lower saddle 53 is movably mounted so as to be movably positioned. On an $X_S$-axis guide 53a secured on the lower saddle 53, a tool post 54 is movably mounted and positioned. A turret 55 is rotatably mounted on the tool post 54 so as to index around a rotation axis in the Z-axis direction and a fixed tool TD is detachably held by a tool holding station of the turret 55.

Further, on the right hand side of the Z-axis guide 41b, a tailstock (not shown) is movably mounted so as to be movably positioned. The imbalance arithmetic unit 30 is constructed in a similar manner to the imbalance arithmetic unit 30 of the first embodiment, except that the arithmetic processor 34 further includes a functional device for calculating an eccentric amount at the correction machining from the calculated imbalance amount and phase and the numerical controller 20 further includes two axes, that is, an $X_S$-axis of the non-round machining unit 46 and an $X_S$-axis of the tool post 54.

Figure 11:
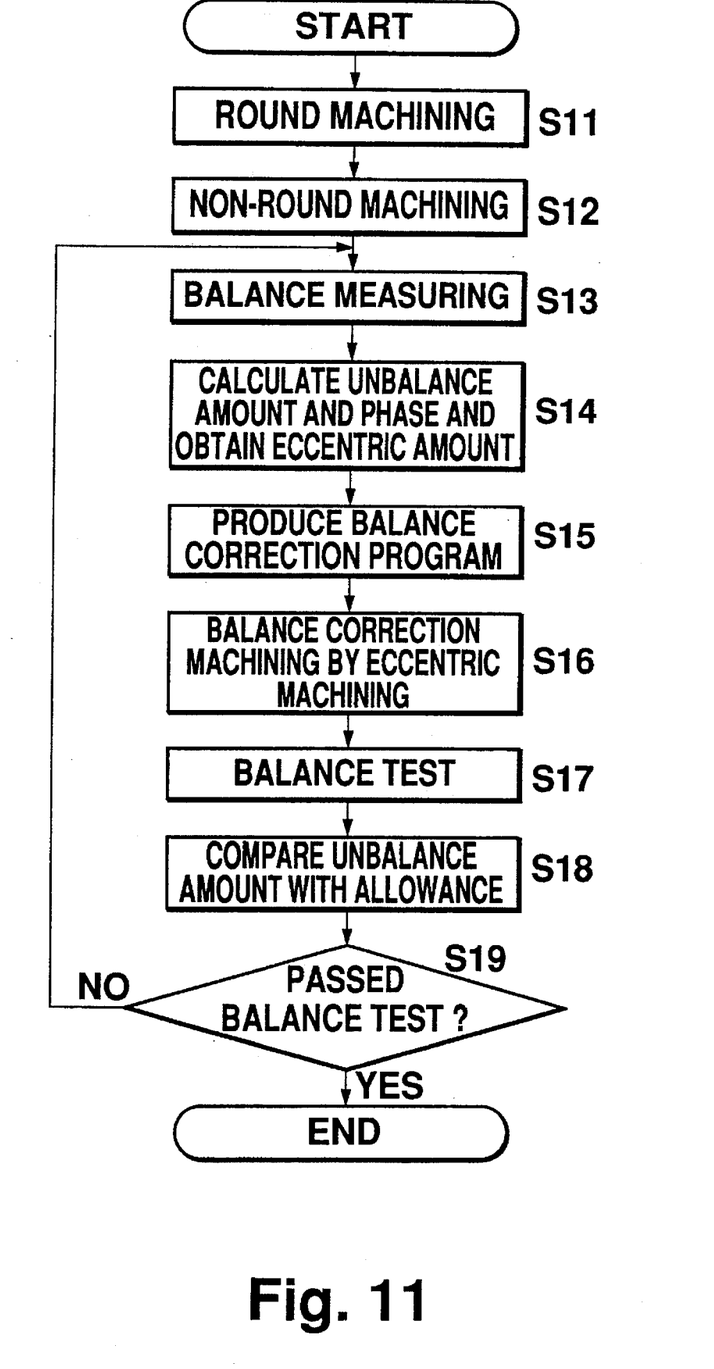
FIG. 11 is a flowchart of an operation of the numerically controlled lathe shown in FIG. 10.

Next, the operation of the third embodiment of the numerically controlled lathe described above will now be described in order of steps in a flowchart shown in FIG. 11 with reference to FIG. 12 to FIG. 14.

Figure 12:
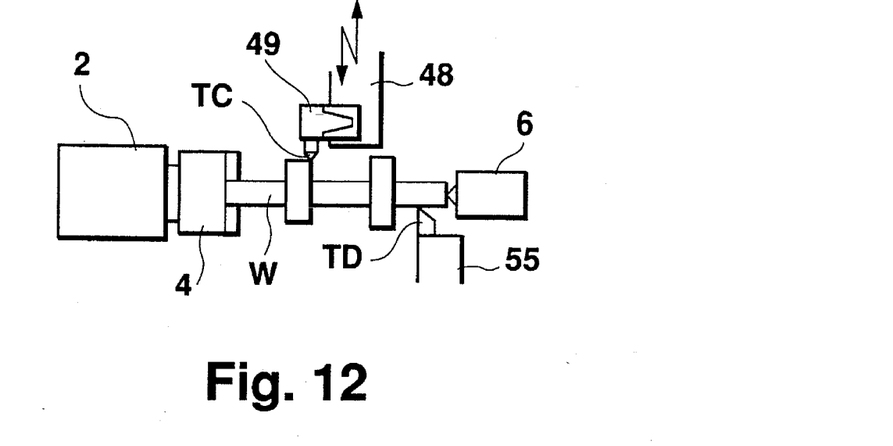
FIGS. 12, 13 and 14 are elevation views of an essential part of the numerically controlled lathe according to the third embodiment of the present invention, for explaining the operation thereof.

First, in step S11, as shown in FIG. 12, round machining of the workpiece W is executed by the fixed tool TD attached on the turret 55 of the tool post 54. In step S12, non-round machining of a cam or the like is carried out by the fixed tool TC of the non-round machining unit 46.

Figure 13:
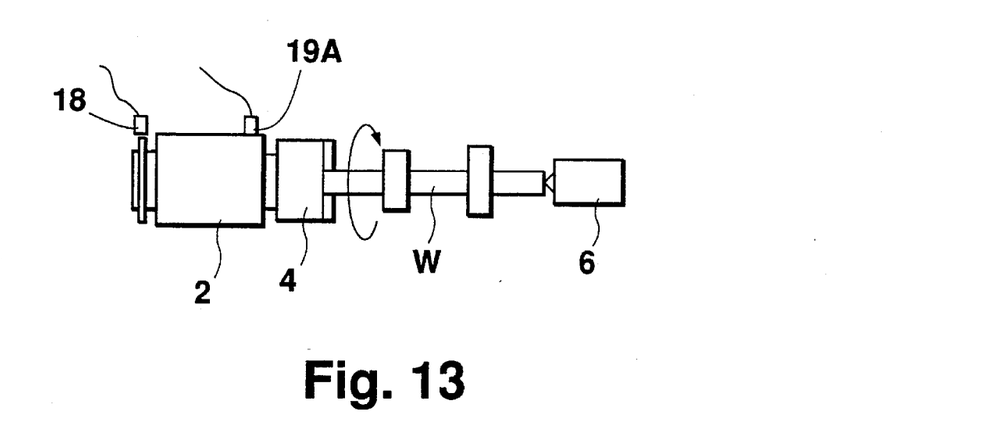
Figure 14:
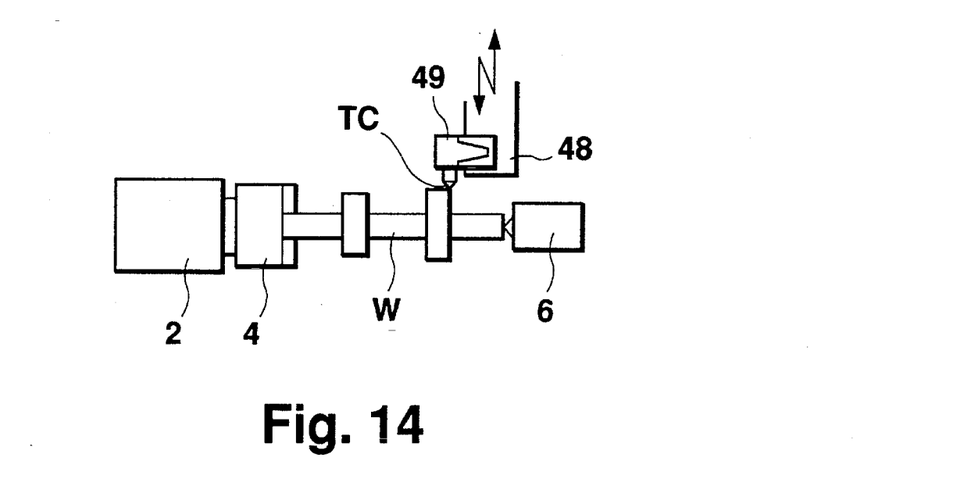

Next, in step S13, as shown in FIG. 13, a balance of the workpiece W is measured. In step S14, an imbalance amount and phase of the workpiece W are calculated from the signals output from the vibration sensor 19A and the rotation angle detection signal of the sensor 18 and further calculates an eccentric amount at the imbalance correction.

Then in step S15, a program for balance correction machining is produced from the obtained eccentric amount. In step S16, as shown in FIG. 14, eccentric machining is carried out in the flange portion on the right hand side of the workpiece W by the non-round machining unit 46 to correct the balance of the workpiece W. Next, in step S17, a balance test of the workpiece W that has Just undergone correction machining is carried out. In step S18, the imbalance amount obtained by the balance test is compared with an allowance previously stored, and in step S19 it is confirmed whether the balance test is passed or not. In the case of YES answer, the operation is finished. On the other hand, in the case of NO answer, the operation is returned to step S13 and the previous steps are repeated in the same manner as described above.

The fourth embodiment of a numerically controlled lathe with a balance corrector according to the present invention will now be described.

Figure 15:
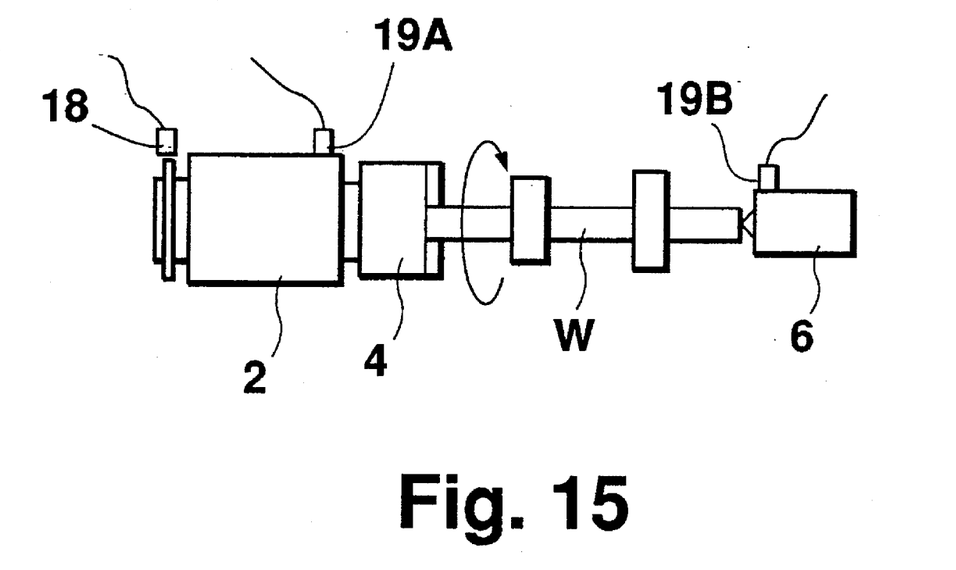
FIG. 15 is an elevational view of an essential part of the fourth embodiment of a numerically controlled lathe according to the present invention, for explaining the operation thereof.

The fourth embodiment is constructed in a similar manner to the third embodiment, except that a second vibration sensor 19B is attached on the rear surface of the tailstock 8, and that the imbalance arithmetic unit further comprises a noise filter (F) 31b for removing noise from the signal output from the vibration sensor 19B, a signal amplifier 32B for amplifyig the output from the noise filter (F), and an A/D converter 33B for converting the analog signal sent from the signal amplifier 32b into a digital signal.

The operation of the fourth embodiment is similar to the operation of the third embodiment, except that in step S14, the signal output from vibration sensor 19B is also used in the calculation of the amount of imbalance and phase, as can be seen from FIG. B.

As described above, according to the present invention the following results can be obtained.

That is, the imbalance amount and phase of the workpiece W are calculated from the output signals of the vibration sensors attached to the headstock and/or the tailstock and the sensor for detecting the main spindle rotation angle, and the depth of the balancing hole or the eccentric amount is calculated to automatically produce the NC program for the balance correction machining. Using the rotary tool or the non-round machining unit, hole drilling or eccentric machining is executed to carried out the balance correction machining. Hence, in the single machine, usual machining and balance correction machining of the workpiece W can continuously be performed. As a result, no conventional balancing machine is required and the transfer of the workpiece W between the two machines is also not necessary.

Hence, automation of part machining requiring balance correction machining can be readily realized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. In a combined machining lathe having fixed-tool turning-workpiece lathe function and a drilling and/or milling function, a numerically controlled lathe with a balance corrector, comprising:

a sensor for detecting a rotation angle of a main spindle;

at least one vibration sensor mounted on a headstock;

means for calculating an imbalance amount and phase of a workpiece from signals output from the sensor and the vibration sensors; and means for producing a program for carrying out equivalent balance correction machining using the drilling and/or milling function from the obtained imbalance amount and phase.

2. In a combined machining lathe having fixed-tool turning-workpiece lathe function and a drilling and or milling function, a numerically controlled lathe with a balance corrector, comprising:

a sensor for detecting a rotation angle of a main spindle;

at least one vibration sensor mounted on a headstock and a tailstock;

means for calculating an imbalance amount and phase of a workpiece from signals output from the sensor and the vibration sensors; and means For producing a program For carrying out equivalent balance correction machining using the drilling and/or milling function from the obtained imbalance amount and phase.

3. In a numerically controlled lathe having fixed-tool turning-workpiece lathe function and a non-round machining function utilizing, a synchronous X-axis feeding of a tool post with a rotation of a main spindle, a numerically controlled lathe with a balance corrector, comprising:

a sensor for detecting a rotation angle of the main spindle;

at least one vibration sensor mounted on a headstock;

means for calculating an eccentric amount at an equivalent balance correction from an imbalance amount and phase of a workpiece, which are calculated from signals output from the sensor and the vibration sensors; and means for producing a program for carrying out balance correction eccentric machining using the non-round machining function from the obtained eccentric amount.

4. In a numerically controlled lathe having fixed-tool turning-workpiece lathe function and a non-round machining function utilizing, a synchronous X-axis feeding of a tool post with a rotaion of a main spindle, a numerically controlled lathe with a balance corrector, comprising:

a sensor for detecting a rotation angle of the main spindle;

at least one vibration sensor mounted on a headstock and a tailstock;

means for calculating an eccentric amount at an equivalent balance correction from an imbalance amount and phase of a workpiece, which are calculated from signals output from the sensor and the vibration sensors; and means for producing a program for carrying out balance correction eccentric machining using the non-round machining function from the obtained eccentric amount.

* * * * *